Patented May 13, 1947

2,420,517

UNITED STATES PATENT OFFICE 2,420,517

DEHYDRATION OF FOODS BY MEANS OF HYDROPHILIC LIQUIDS

John D. Brandner, Wilmington, and Rudolph Max Goepp, Jr., New Castle, Del., assignors to Atlas Powder Company, Wilmington, Del., a corporation of Delaware No Drawing. Application May 7, 1943, Serial No. 486,086

8 Claims. (Cl. 34—9)

The present invention relates to improvements in the dehydration of foods and resides in a new process for accomplishing the dehydration and also in the resulting dehydrated foods.

An object of the invention is to provide a process whereby substantial quantities of water can be removed from structured foods for the purposes of rendering them more readily transportable and preserving them.

Another object is to provide a dehydrating process for foods in which at least part of the water is rapidly removed from the food at low temperatures by means which preserve the structure and flavor of the food and assist in its rehydration.

A further object of the invention is to provide dehydrated structured foods which can be compressed into compact forms and which are capable of rehydrating readily and of returning substantially to their fresh size, shape, texture, color and flavor.

The above and other objects will become more apparent from the following description.

Foods are dehydrated for two principal reasons. The first of these reasons is to preserve them against spoilage. Thus, it is a very old practice to dry a large variety of meats, fish, vegetables, and fruits solely for the purpose of preserving them. Another object in drying foods, and one which has become of great interest at the present time, is the dehydration of foods for the purpose of saving weight and space so that a larger quantity can be transported by given facilities. The general approach to the problem of drying foods has been to employ heating, dry air, or both, and by sufficiently prolonged treatment remove the desired portion of the natural water of the food. By this process, a great many foods and particularly vegetables are permanently altered as to texture, shape, color, odor, and taste. The process of drying by this customary means appears to result in a breaking down of the cell structure of the food and also in many cases to a type of case-hardening of the surface, neither of which is reversible when the dried food is later treated with water. The problem is particularly acute in the case of foods which are normally eaten in relatively large sized pieces, for, in such cases, attractiveness and palatability are closely associated with the texture, shape, and color, the very elements seriously impaired by conventional drying processes. Particular difficulty has been experienced in the dehydration of most of the vegetables.

According to the present invention, it has been found possible to dehydrate food products by a simple operation which produces a product that can be rehydrated rapidly to a condition resembling the undried food in attractiveness and palatability.

In the process of the invention a large part of the dehydration is accomplished at normal temperatures by immersing the food for a relatively short time in organic hydrophilic material in a tank or other vessel, preferably one provided with means for agitation. Where the first stage of the drying operation is conducted in this way and followed by an oven drying operation to complete the dehydration, the length of the oven drying treatment may be considerably shortened by comparison with the conventional process.

The invention involves two principal actions, first, the removal of water, and secondly, the impregnation of the food with a strongly hydrophilic material. These two actions take place, in part at least, at the same time, the hydrophilic material being used both to abstract water and to impregnate the food. The process can be conducted in several different ways to accomplish the results desired. The preferred method is to immerse the fresh food at room temperature in a relatively dilute aqueous solution of the hydrophilic material for a time, and thereafter to increase the concentration of the hydrophilic material; or to immerse successively the food in a series of solutions of increasing concentration. In this way the food takes up the hydrophilic substance initially from a dilute, relatively low viscosity solution and loses water at the same time. As the concentration of the hydrophilic solution increases, the loss of water continues. This phase of the process is referred to herein as "displacement drying" to distinguish it from the conventional heat and/or dry air dehydration.

In accordance with the process of the invention drying is accomplished by contacting the food with a solution of the hydrophilic substance of a concentration sufficiently high to abstract water. The particular concentrations required will depend principally upon the hygroscopicity of the hydrophilic substance, the osmotic pressure within the cells of the food, temperature, and relative volumes of dehydrating solution and the water in the food, as will be understood by those skilled in the art. Drying can be performed by contact with a dehydrating solution of one concentration, or preferably, by contact with different concentrations of dehydrating solution.

The absorption of hydrophilic material into the food proceeds at a much slower rate than dehydration. Thus, there is initially a decrease in weight. If the food is allowed to remain in contact with the hydrophilic solution, the weight will now begin to increase due to absorption of the hydrophilic solution. By separating the food from the dehydrating solution at a time when a large amount of water has been abstracted and a loss in initial weight has occurred, but before the weight of the food has begun to increase, that is, before the rate of absorption of dehydrating solutions exceeds the rate of loss of water, products are obtained which are lighter in weight than the starting food material and which contains absorbed hydrophilic material in amounts sufficient to assist in the rehydration of the food to a state closely approximating its state before drying.

The drying process is completed by an evaporation stage. The removal of water can be carried out suitably by oven drying or vacuum drying. This achieves the removal of remaining water and dries the hydrophilic material into the food. In an oven drying operation air of low relative humidity can be used throughout as distinguished from conventional heat dehydration processes which require the use of high humidities at the start to prevent case-hardening.

The dried food products produced according to the invention are heavier for a given water content than corresponding products produced by straight conventional drying processes, due to the presence of the hydrophilic material, but their final weight is only a small fraction of the fresh weight of the food. The products of the invention rehydrate rapidly and return to a state much more similar to the fresh state of the food than the conventional dried foods. In particular the rehydrated products of the invention have a firm natural texture and generally exhibit improved color, odor and flavor. The improvement in the quality of the food on rehydration is believed to be attributable to the presence of the hydrophilic material in the dried food and to the fact that in the drying operation a substantial proportion of water is removed from the food without the aid of heat by a gentle process partly involving replacement with hydrophilic material, thereby avoiding hardening and cellular collapse. The hydrophilic material is believed to speed rehydration by reason of its avidity for water and because by its presence the structure of the food is kept open and receptive to water.

Variations of the process described above can be made in the condition of the food at the time it is introduced into the hydrophilic solution. Thus some preliminary heat and/or dry air drying can take place before the displacement drying. This preliminary drying should be stopped before hardening of the food takes place and before the cell structure collapses. In general there is no advantage in such partial drying and the quality of the product is inferior to the product of the preferred process.

Another variation consists in diluting the treating solutions with a non-toxic liquid other than, or in addition to, water. For example, ethanol, or water and ethanol can be used. The chief advantage of this variation resides in eliminating or minimizing the effect of contacting the food with water, and a secondary advantage with some hydrophilic materials is in reducing viscosity of the hydrophilic solution. Disadvantages attending the use of ethanol are the tendencies to toughen the food and to dissolve out color and flavor bodies.

In place of conducting the displacement drying at room temperatures other temperatures can be employed. Lower temperatures are less desirable because of the increase in the viscosity of the dehydrating solutions. Higher temperatures can be used to advantage in many cases. The upper temperature limits depend on the heat resistance of the food being processed and the heat resistance of the hydrophilic material used. For example, in the dehydration of carrots and beets with corn syrup, sorbitol or glucose solutions a temperature not in excess of 120° F. is preferred.

Before oven drying the treated products, it may be advantageous to remove surplus dehydrating solution by any suitable means such as gravity separation or centrifuging which may be augmented by rinsing the food with water, alcohol or other suitable solvent.

The organic hydrophilic material used in the process can be selected from a wide range of available materials. The general requirements of the organic hydrophilic material are that it must be highly water-soluble, hygroscopic at least in form of the solutions employed, non-toxic, unobjectionable in flavor and odor, and of suitable color, and less volatile than water. High water solubility is necessary because of the desirability of using solutions of high concentrations. The requirements of non-toxicity and unobjectionable flavor, color, and odor are obvious necessities for a food product. The hydrophilic material must be less volatile than water to permit the use of a final evaporation step to remove water from the food without removing the hydrophilic material. Examples of suitable hydrophilic materials for the process are glycerol, sorbitol, non-crystallizing commercial sorbitol syrup (such as that sold under the trade-mark "Arlex"), glucose, corn syrup (such as the C. S. U. of commerce), fructose, invert sugar, sucrose, and cane molasses. In addition to these compounds, there may also be used chemical derivatives of compounds of these types which also meet the requirements expressed above. Preferred hydrophilic materials are the polyhydric alcohols, monosaccharides and oligosaccharides which meet the above requirements. Other organic hydrophilic materials include urea, amino acids such as glycine, and hydroxy acids such as the sugar acids and their esters, which meet the requirements set forth. Of the materials specified, the corn syrup is preferable for many applications because of its relative tastelessness, freedom from odor, low cost and commercial availability. Two or more hydrophilic materials may be used in this process either simultaneously or successively. The sugars, polysaccharides and many of the polyhydric alcohols are particularly useful for the purposes of the invention because of the fact that they have food values in themselves.

The invention can be applied to the dehydration of all foods in which it is desired to retain the original characteristic cell tissue structure, although some reduction in size, as by slicing or dicing, may be desired. The term "structured foods" is used herein to describe this class of foods and to distinguish from liquid, mashed or powdered foods and foods lacking in cellular structure. The need for the process is greatest, however, in the case of foods which contain a very large initial proportion of water and low natural sugar content, and which are to be preserved in relatively large sized pieces. The invention is of particular advantage in connection with foods which are eaten in large pieces in consequence of which the texture and shape of the food form an important part of the palatability and attractiveness of the food. In this class the outstanding foods are the vegetables, and particularly such vegetables as carrots, beets, celery, rhubarb, string beans, asparagus, potatoes, and the like. The invention will be described particularly with reference to carrots and beets, but it is to be understood that it is applicable generally to other food products including meats, fish and fruits.

EXAMPLE I

Fresh carrots were prepared for dehydration by a preliminary treatment of conventional type consisting of the following steps. The carrots were scraped with a knife, washed, sliced into julienne style strips about ¼ inch square in cross-section and 1 to 1¼ inches long. The carrots were placed on a wire mesh tray and were blanched for five minutes with live steam.

(a)

Blanched carrots prepared as indicated were treated by immersion at room temperature successively in aqueous C. S. U. (commercial corn syrup) solutions of 30%, 60%, and 80% total solids for 60 minutes, 45 minutes, and 55 minutes respectively. Each of the solutions was used in a quantity approximately double the weight of the carrots. After each of these solutions the carrots were removed from the solutions, drained on the wire mesh trays and weighed. Thereafter the carrots were oven dried for 10 hours 20 minutes at a temperature of 140–145° F. at an air humidity initially 20 to 30% R. H. and finally 10 to 15% R. H.

(b)

Blanched carrots prepared as indicated were treated in the same way as in part (a) except that the C. S. U. of part (a) was replaced with non-crystallizing aqueous solutions of commercial sorbitol ("Arlex") of 30%, 60%, and 85% total solids. This was followed by oven drying as in part (a).

(c)

A further quantity of blanched carrots prepared as indicated was treated by soaking 30 minutes in a 30% solution of glucose in water, followed by 15 minutes in a 75% solution of glucose in water. Each of these glucose solutions was used in a quantity approximately double the weight of the carrots. The product was separated from the glucose solution and then rinsed with a 75% solution of ethanol in water. Following this displacement drying the product was dried for 7 hours in an oven at the same temperatures and air humidities as in parts (a) and (b).

(d)

A further quantity of blanched carrots prepared as indicated, was immersed in about twice its weight of an aqueous solution of C. S. U. of 30% total solids and shaken mechanically for 45 minutes. The solution was removed and replaced with an equal quantity of an aqueous solution of C. S. U. of 60% total solids and the carrots and new solution were shaken mechanically for about 16 hours. Following this treatment the product was separated from the solution and placed in the oven and dried for 6 hours and 5 minutes at the same temperatures and air humidities as in the preceding examples.

STANDARD

As a standard for comparison with the foregoing, blanched carrots prepared as indicated were dried by conventional oven drying at temperatures initially 165–170° F. and finally 140–145° F. and at humidities initially 50 to 60% R. H. and finally 10 to 15% R. H. The oven drying lasted for 13 hours.

The following table follows the course of weight loss of the carrots treated by the four processes and compares the products. The course of rehydration of the various samples was tested by a procedure involving refreshing and cooking. The "refreshing" consisted in placing a weighed quantity of the product at room temperature in distilled water equal in quantity to about the amount of water lost on dehydration. After 15 minutes any water not absorbed was poured off and the gain in weight of the carrots noted.

The "cooking" consisted in adding about the same quantity of fresh cold distilled water to the "refreshed" carrots, rapidly heating to boiling and maintaining at boiling for 15 minutes. The water was then poured off and the carrots again weighed. The appearance, texture, odor and taste of the cooked carrots were noted.

| | Per cent of Original Weight | | $H_2O$ in Dried Product | Rehydration Per cent of Original Weight | | Observation on Refreshed and Cooked Material |
|---|---|---|---|---|---|---|
| | After Displacement Drying | After Oven Drying | | On refreshing | On Cooking | |
| | | | Per cent | | | |
| (a) | 62.8 | 20.5 | 2.20 | 37.9 | 61.1 | Appearance better than standard, texture excellent, odor and flavor good as standard. |
| (b) | 63.4 | 25.7 | 4.34 | 47.7 | 74.7 | Appearance and texture better than standard, flavor bland and sweet. |
| (c) | 77.4 | 29.0 | 3.37 | 46.9 | 62.3 | Little dark, texture good, flavor good but sweet. |
| (d) | 39.4 | 24.3 | 7.95 | | 59.0 | Appearance better than standard, trifle dark texture crisp, flavor good, odor fair. |
| Standard | | 13.6 | 2.54 | 30.1 | 53.2 | Appearance fair, dark colored, texture soft, odor and flavor fair. |

EXAMPLE II

Fresh beets were blanched with steam for 20 minutes then peeled and washed and sliced in julienne style strips of ¼ inch square cross-section and about 1 inch in length.

(a)

Blanched beets prepared as indicated were treated by immersion successively in aqueous solutions of C. S. U. (corn syrup) of 30%, 60%, and 80% solids concentrations for 60 minutes, 45 minutes, and 55 minutes respectively. Corn syrup solutions of approximately twice the weight of the beets were used in each case. After each of these solution treatments the beets were removed from the solution, drained on a wire mesh tray, and weighed. Thereafter the beets were oven dried for 10 hours 20 minutes at a temperature of 140-145° F. and at an air humidity initially 20 to 30% R. H. and finally 10 to 15% R. H.

(b)

Blanched beets prepared as indicated were treated in the same way as in part (a) except that non-crystallizing aqueous solutions of commercial sorbitol ("Arlex") of 30%, 60%, and 85% total solids were substituted for the three C. S. U. solutions. This displacement drying was followed by oven drying as in part (a).

(c)

Blanched beets prepared as indicated were treated by soaking 30 minutes in a 30% aqueous glucose solution, then 60 minutes in a 67% aqueous glucose solution, followed by 15 minutes in a 75% aqueous glucose solution. Each of these glucose solutions was used in a quantity approximately double the weight of the beets. The product was separated from the glucose solutions and then rinsed with a 75% solution of ethanol in water. Following this displacement drying the product was dried for 7 hours in an oven at the same temperatures and humidities as in parts (a) and (b).

(d)

A further quantity of blanched beets prepared as indicated, was immersed in about twice its weight of an aqueous solution of C. S. U. of 30% total solids and shaken mechanically for 45 minutes. The solution was removed and replaced with an equal quantity of an aqueous solution of C. S. U. of 60% total solids and the beets and new solution were shaken mechanically for about 16 hours. Following this treatment the product was separated from the solution and placed in the oven and dried for 6 hours and 5 minutes at the same temperatures and air humidities as in the preceding examples.

STANDARD

As a standard for comparison with the foregoing, blanched beets prepared as indicated were dried by conventional oven drying at temperatures initially 165-170° F. and finally 140-145° F. and at air humidities initially 50 to 60% R. H. and finally 10 to 15% R. H. The oven drying lasted for 13 hours.

The following table follows the course of weight loss (water) of the beets treated by the four processes and compares the products. The "refreshing" and "cooking" were conducted as described above in Example I.

tions and other process variables are subject to many variations to suit the particular food to be dehydrated and the facilities available for conducting the process. The preliminary preparation of the food product can be varied in many ways as will be apparent to those skilled in the art. Preliminary blanching of certain foods like carrots and beets is a customary treatment which may be employed wherever desirable.

In dealing with fat or oil-containing foods, a preliminary defatting treatment may be employed, and the penetration of the hydrophilic material may be facilitated by the addition of suitable surface active agents to the hydrophilic solution.

Dehydrated foods are frequently compressed after drying in order to reduce bulk. The present invention produces dehydrated foods that are pliable and can readily be compressed, the hydrophilic material providing an adhesive bond which is rapidly broken when the product is placed in water thereby facilitating the rehydration of the food.

In conjunction with the dehydration process of the invention flavors and seasonings of various types can be added to the foods.

This process is also applicable to the preservation of feeds for animals, in which case urea can advantageously be used as the hydrophilic material because of its value as a nitrogenous food.

We claim:

1. The process for drying structured foods with high water content which comprises contacting the food with a dehydrating solution of successively increasing concentrations of a non-toxic, organic hydrophilic substance, which is highly water-soluble and unobjectionable in taste, odor, and color, and which is less volatile than water until the food loses a substantial amount of its water content, and separating the dehydrating solution from the food before the rate of absorption of dehydrating solution by the food exceeds the rate of loss of water.

2. The process for drying structured foods with high water content which comprises contacting the food with a relatively dilute dehydrating solution of a non-toxic, organic hydrophilic substance which is highly water-soluble and unobjectionable in taste, odor, and color, and which is less volatile than water until the food loses a substantial quantity of its water content, thereafter contacting the food with a dehydrating solution with a higher concentration of said hydrophilic substance until the food loses a further quantity of its water content, and separating the dehydrating solution from the food before the rate of absorption of dehydrating solution by the food exceeds the rate of loss of water.

| | Per cent of Original Weight | | H₂O in Dried Product | Rehydration Per cent of Original Weight | | Observation on Refreshed and Cooked Material |
|---|---|---|---|---|---|---|
| | After Displacement Drying | After Oven Drying | | On refreshing | On Cooking | |
| | | | Per cent | | | |
| (a) | 59.0 | 16.1 | 3.35 | 33.7 | 56.0 | Less wrinkled than standard, texture good, flavor and odor good. |
| (b) | 61.5 | 23.1 | 5.63 | 40.3 | 61.6 | Less wrinkled than standard, texture good, flavor sweet. |
| (c) | 70.3 | 27.9 | 5.83 | 49.3 | 63.5 | Well plumbed, texture excellent, sweet but good beet flavor. |
| (d) | 31.7 | 19.4 | 4.69 | | 63.4 | Appearance better than standard, texture firm but tough, flavor and odor better than standard. |
| Standard | | 10.7 | 2.77 | 24.2 | 40.0 | Dark and wrinkled, texture soft, odor and flavor fair. |

The strengths of hydrophilic solution used, lengths of soaking periods, final drying condi- 3. The process for drying structured foods with high water content which comprises contacting the food with a relatively dilute dehydrating solution of a non-toxic, organic hydrophilic substance which is highly water-soluble and unobjectionable in taste, odor, and color, and which is less volatile than water until the food loses a substantial quantity of its water content, thereafter increasing the concentration of said hydrophilic substance in the dehydrating solution and continuing the contact thereof with said food until a further quantity of water is removed from the food, and separating the dehydrating solution from the food before the rate of absorption of dehydrating solution by the food exceeds the rate of loss of water.

4. A process as in claim 2 wherein the food separated from the dehydrating solution is further dehydrated to a state of substantial dryness by evaporating water therefrom.

5. A process as in claim 3 wherein the food separated from the dehydrating solution is further dehydrated to a state of substantial dryness by evaporating water therefrom.

6. The process for drying structured vegetable foods of high water content which comprises contacting the food with a relatively dilute aqueous dehydrating solution of corn syrup, until the food loses a substantial part of its initial weight, thereafter contacting the said food with an aqueous corn syrup solution of higher concentration, until the food loses a further part of its initial weight, separating the food from the said solution of higher concentration before the rate of absorption of corn syrup solution by the food exceeds the rate of loss of water, and evaporating substantially all of the residual water from the food.

7. The process for drying structured vegetable foods of high water content which comprises contacting the food with a dehydrating solution of corn syrup until the food loses a substantial quantity of its water content, and separating the dehydrating solution from the food before the rate of absorption of dehydrating solution by the food exceeds the rate of loss of water.

8. The process for drying structured vegetable foods of high water content which comprises contacting the food with a dehydrating solution of a non-toxic, organic hydrophilic substance which is highly water soluble, and unobjectionable in taste, odor, and color, and which is less volatile than water until the food loses a substantial quantity of its water content, contacting the food successively with increasing concentrations of said hydrophilic substance in dehydrating solution, and separating the dehydrating solution from the food before the rate of absorption of dehydrating solution by the food exceeds the rate of loss of water.

JOHN D. BRANDNER.
RUDOLPH MAX GOEPP, Jr.

REFERENCES CITED

The following references are of record in the file of this patent:

UNITED STATES PATENTS

| Number | Name | Date |
|---|---|---|
| 90,160 | Fleck | May 18, 1869 |
| 2,017,177 | Bassett | Oct. 15, 1935 |
| 1,393,540 | Kelly | Oct. 11, 1921 |
| 1,996,395 | Arnold | Apr. 2, 1935 |
| 2,354,495 | Bodenstein | July 25, 1944 |
| 2,060,902 | Stamm | Nov. 17, 1936 |

FOREIGN PATENTS

| Number | Country | Date |
|---|---|---|
| 359,641 | Great Britain | Oct. 29, 1931 |

OTHER REFERENCES

Ex parte Fesenmeier decision, 1922, C. D. 18.

Ex parte Appeal No. 214, October 28, 1944, digested on pages 855 of the December 1944 issue of the Journal of Patent Office Society.